United States Patent [19]

Jacquel

[11] Patent Number: 5,062,032

[45] Date of Patent: Oct. 29, 1991

[54] INSTALLATION FOR THE CONTROL OF SEVERAL ELECTRICAL RECEIVERS CAPABLE OF BEING IN AT LEAST TWO STATES

[75] Inventor: Dominique Jacquel, Cluses, France

[73] Assignee: Somfy, Cluses, France

[21] Appl. No.: 376,249

[22] Filed: Jul. 6, 1989

[30] Foreign Application Priority Data

Jul. 29, 1988 [FR] France ........................ 88 10282

[51] Int. Cl.[5] ........................ G05B 15/00

[52] U.S. Cl. ........................ 364/131; 364/143

[58] Field of Search ........................ 364/131-136, 364/141, 143, 200 MS File, 900 MS File

[56] References Cited

U.S. PATENT DOCUMENTS

| | | | |
|---|---|---|---|
| 4,594,651 | 6/1986 | Jaswa et al. | 364/131 |
| 4,672,232 | 6/1987 | Schoen | 364/141 |
| 4,675,803 | 6/1987 | Kendall et al. | 364/131 |
| 4,682,279 | 7/1987 | Watabe | 364/141 |
| 4,752,868 | 6/1988 | Nicholas et al. | 364/132 |
| 4,799,140 | 1/1989 | Dietz et al. | 364/140 |
| 4,807,184 | 2/1989 | Shelor | 364/131 |
| 4,835,706 | 5/1989 | Asahi | 364/132 |
| 4,858,101 | 8/1989 | Stewart et al. | 364/474.11 |
| 4,916,600 | 4/1990 | Ropelato | 364/131 |
| 4,998,027 | 3/1991 | Mihara et al. | 364/242.7 |
| 5,003,457 | 3/1991 | Ikei et al. | 364/133 |

*Primary Examiner*—Jerry Smith
*Assistant Examiner*—Jim Trammell
*Attorney, Agent, or Firm*—Laff, Whitesel, Conte & Saret

[57] ABSTRACT

The installation comprises, in each individual control device (11) a logic processing unit (1) provided, on the one hand, for successively accepting the commands given non-simultaneously by the individual control device or by the general control device and, on the other hand, in the case in which the general and the individual control are operated simultaneously, for accepting, as a matter of priority, the command from the general control unless the latter is of a duration shorter than a first predetermined value T1 and if at the time of the start of the command from the general control at least one of the means of control of the individual control device has been actuated for a duration longer than a second predetermined value T2.

3 Claims, 5 Drawing Sheets

INSTALLATION FOR THE CONTROL OF SEVERAL ELECTRICAL RECEIVERS CAPABLE OF BEING IN AT LEAST TWO STATES

FIELD OF THE INVENTION

The object of the invention is an installation for the control of several electrical receivers capable of being in at least two states, comprising individual control devices respectively associated with receivers and each comprising means of switching intended to control, at will, the corresponding receiver, each individual control device being controlled by means of a common control line by a general control device comprising means of switching intended to control, at will, all of the receivers, the means of switching being capable of supplying commands having a duration longer than or shorter than a predetermined value, each individual control device comprising a logic processing unit comprising a first group of input terminals to which are connected the means of switching of the individual control device and output terminals connected to the receivers, the means of switching of the general control device being connected to a second group of inputs of each logic processing unit, each logic processing unit being provided to accept successively the commands given in a non-simultaneous manner by the general control device and the individual control device. The electrical receivers can, for example, be motors, heating resistors or lighting bulbs. A particular application is that of the control of blinds and of rolling shutters.

PRIOR ART

An installation of this type is described in the patent FR 2,510,777. In this prior installation, each logic processing unit is furthermore provided to accept only the command given by the general control device, when this command is given simultaneously with a command from the corresponding individual control device. According to one embodiment this absolute priority of the general control can be removed by means of a third switch M/A in addition to the two "raise" and "lower" switches, enabling a choice to be made between the manual mode and the automatic mode which, when it is set in the position M causes the refusal, by the logic processing unit, of a command given by the general control device if the duration of this command is shorter than a predetermined value. In use, this method of control however has the following disadvantage: when the priority command, of duration longer than the said predetermined value, coming from the general control, having consequently modified the state of the receivers, stops, the corresponding receivers do not resume their initial position and it is then necessary to reactivate the individual control. By way of example, the case of a blind will be quoted for which the third M/A switch is set to "MANUAL", which has been unrolled and then re-rolled by a priority "raise" command, (wind, rain). When the priority command ceases, the blind will not resume its initial unrolled position by itself, but it will be necessary for the user to specially actuate the individual control device. Furthermore, the significance of the M/A switch is often not clear to the user who has a tendency to set the M/A switch to the manual mode prior to any operation of the "raise" or "lower" switches, which is an error, the manual mode not having the effect of allowing control by means of the individual M/I "raise" and D/I "lower" switches but of isolating the corresponding receivers from the non-priority commands from the general control, as is described in the patent FR 2,510,777.

The control according to the prior art is furthermore relatively complex since it makes use of at least three switches without considering the volume of wiring resulting from this.

The principal object of the present invention is to enable the automatic re-execution of the individual control whose state has been modified by a general priority command.

SUMMARY OF THE INVENTION

The installation according to the invention is characterized in that each logic processing unit of the individual control devices is arranged in such a way that in the case in which the general control and the individual control are actuated simultaneously, the logic processing unit accepts the general control command as a matter of priority unless the latter is of a duration shorter than a first predetermined value and if, at the time of the start of the general control command, at least one of the control means of the individual control device has been actuated for a duration longer than at least a second predetermined value.

These conditions enable the use of the same switch of the individual control for controlling the receiver and for selecting the operating mode, which enables the elimination of the M/A mode selection switch of the prior art, which has the effect of making the use of the individual control simpler and more certain and furthermore reduces the cost and volume of the wiring and consequently of the installation.

BRIEF DESCRIPTION OF THE DRAWINGS

Two embodiments of the invention will be described by way of example with reference to the appended drawing in which.

DESCRIPTION OF THE PREFERRED EMBODIMENTS

Figure 1:
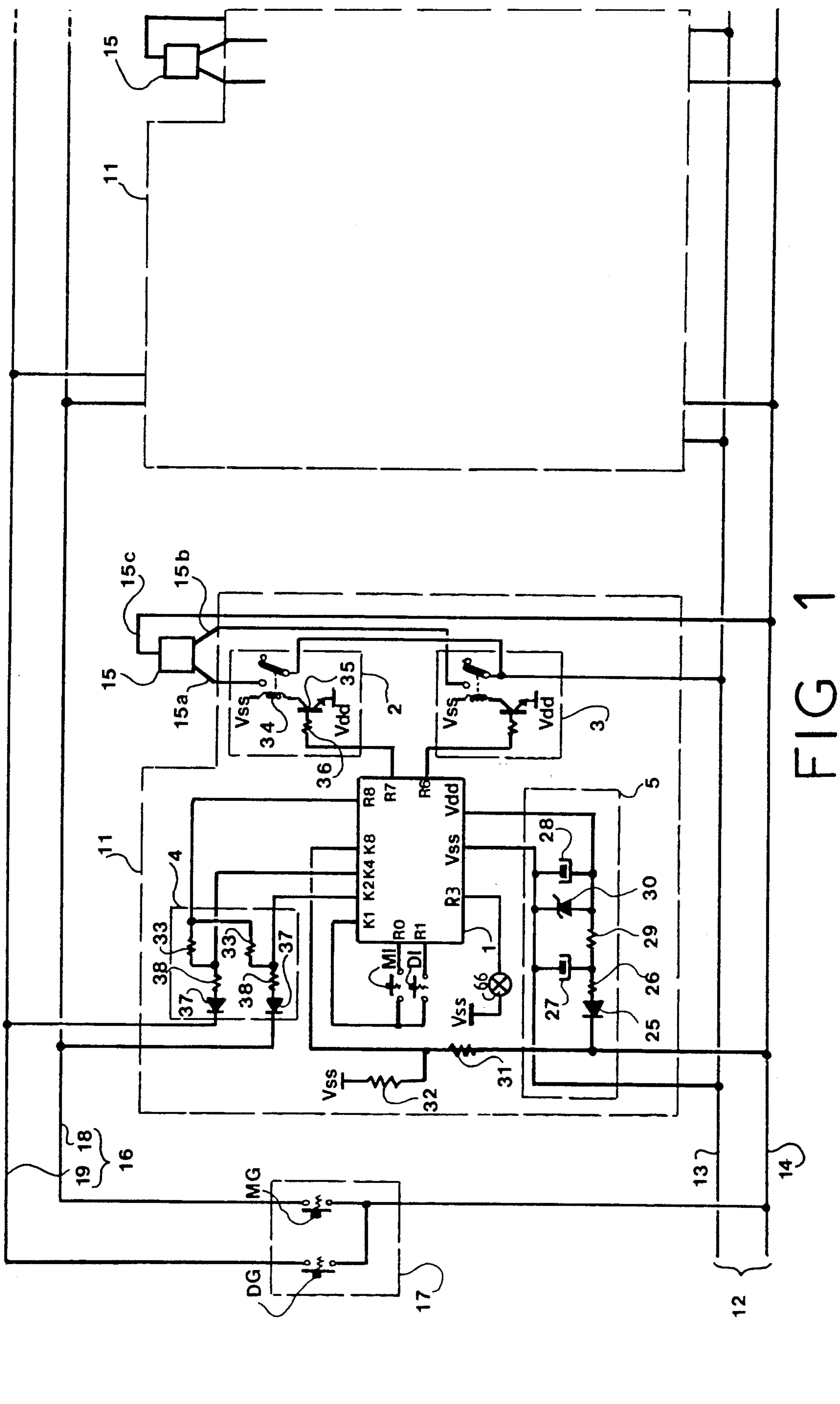
FIG. 1 shows the circuit diagram of a first embodiment.
Figure 2:
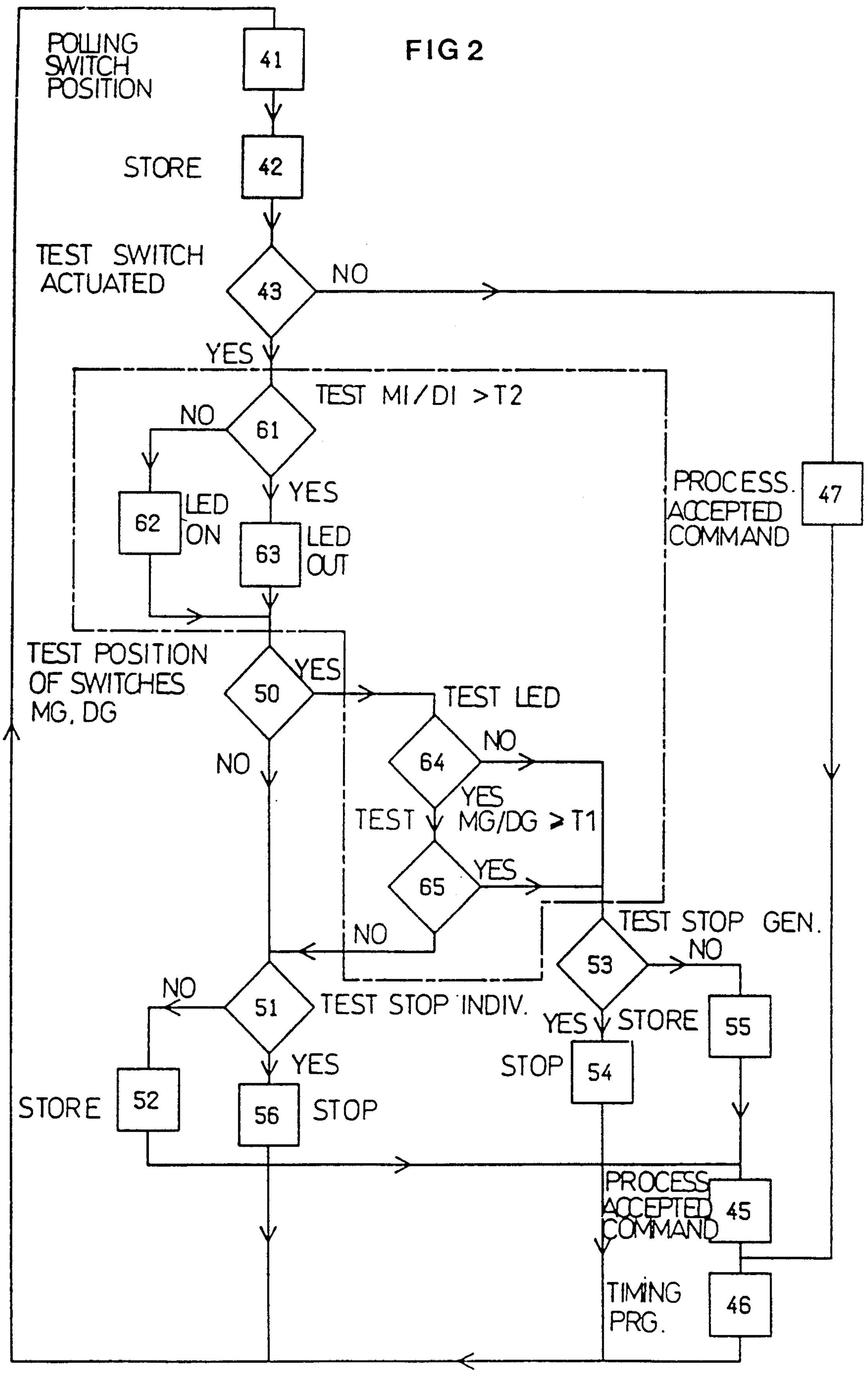
FIG. 2 is a diagram of the programs contained in the non-volatile memory of the microcomputer constituting the logic processing unit, in this first embodiment.

The circuit diagram of the installation shown in FIG. 1 is identical to the circuit diagram shown in FIG. 1 of the patent FR 2,510,777 with, in addition, an LED 66 connected between the power supply terminal Vss of the microcomputer 1 and the output terminal R3 of this microcomputer 1. The description of this circuit will therefore not be repeated here in detail. It will suffice to recall that this circuit comprises individual control devices 11 connected to the A.C. supply network 12 by two conductors 13 and 14, these individual control devices 11 being respectively associated with electrical receivers 15, for example the motors of blinds or conveyor belts, and comprising means of switching constituted by a switch MI (raise) and a switch DI (lower) each having a working position and a rest position. It will be stated that, in the particular case, these switches can be set in their working position. The installation furthermore comprises a general control device 17 connected, on the one hand, to the power supply network 12 and, on the other hand, to the common control line 16 comprising two conductors 18 and 19. This general control device 17, comprises, in the example in question, two switches MG (raise) and DG (lower). These switches can be manual switches or switches automatically controlled, for example by sensors, for example solar brightness sensors, wind sensors, rain sensors etc., in the case in which the installation is used for the control of blinds.

As in the prior art, the microcomputer 1 comprises a non-volatile memory which contains a polling program 41, a storage program 42, a test program 43, a program for managing the commands received and comprising several subroutines 50, 51, 52, 53, 54, 55 and 56, a program for processing the accepted command 45, a program for processing the accepted command 47 and a timing program 46. In addition to these programs the non-volatile memory comprises, between the test program 43 and the first subroutine 50 of the program for managing the received commands, subroutines 61, 62 and 63. The non-volatile memory furthermore comprises two subroutines 64 and 65 between the subroutine 50 on the one hand and the subroutines 51 and 53 on the other hand. It is recalled that the program 43 tests that at least one switch MI, DI, MG, DG is operated and that the subroutine 50 tests that it is a command coming from the general control and the subroutines 51 and 53 respectively test the STOP function of the individual control and the STOP function of the general control.

The subroutine 61 is a test subroutine testing the existence of a command MI or DI, on the individual control, of a duration longer than a predetermined value T2.

The subroutine 62 is an indicator actuation subroutine provided for actuating an indicator, constituted by a memory block in the central unit of the microcomputer 1, in the case in which the command on the individual control is of a duration longer than the predetermined value T2. In the individual execution, the state of this indicator is displayed by means of a LED 66 by actuating the output R3.

The subroutine 63 is an indicator de-actuating subroutine provided for de-actuating the indicator in the case in which the command on the individual control is of a duration shorter than the predetermined value T2. It also deactuates the output R3 and the LED 66 switches off.

The subroutine 64 is a test subroutine provided for testing that the indicator is actuated.

The subroutine 65 is a test subroutine provided for testing that the command from the general control is actuated for a time at least equal to the predetermined value T1.

The program 41 for polling the on or off position of each of the switches MI, DI, MG, DG comprises instructions the last one of which precedes the first instruction of the program 42 for storing these positions. The last instruction of this program 42 precedes the first instruction of the test program 43 which tests the fact that at least one switch has been actuated. The last instruction of the program 43 is a conditional call instruction to the address of the first instruction of the program 47 of the processing of the first accepted command, or to the address of the first instruction of the program for managing received commands comprising the subroutines 61 to 65 and 50 to 54. The subroutine 61 tests the existence of a command from the individual control having a duration longer that T2. The last instruction of the subroutine 61 is an instruction to the address of the first instructions of the subroutine 62 for actuating the indicator or to the address of the first instruction of the subroutine 63 for deactuating the indicator. The last instructions of the subroutines 62 and 63 precede the first instruction of the subroutine 50 for testing the position of the switches of the general control device, the position being stored in the program 42. The last instruction of the subroutine 47 precedes the first instruction of the timing program 46.

The last instruction of the subroutine 50 is a conditional call instruction to the address of the first instruction of the subroutine 64 for testing that the indicator is actuated or to the address of the first instruction of the subroutine 51 for testing the STOP function coming from the corresponding individual control device. The last instruction of the subroutine 64 is a conditional call instruction to the address of the first instruction of the subroutine 53 for testing the STOP function coming from the general control device or to the address of the first instruction of the subroutine 65 for testing that the command from the general control has been actuated for a time at least equal to T1. The last instruction of the subroutine 65 is a conditional call instruction to the address of the first instruction of the test subroutine 51 or to the address of the first instruction of the STOP test subroutine 53. The last instruction of the subroutine 53 is a conditional call instruction to the address of the first instruction of the subroutine 55 for storing the command given by the general control device or to the address of the first instruction of the subroutine 54 for processing the STOP function coming from the general control device. The last instruction of the subroutine 54 precedes the first instruction of the polling program 41. The last instruction of the subroutine 51 is a conditional call instruction to the address of the first instruction of the subroutine 56 for processing the STOP function coming from the corresponding individual control device, or to the address of the first instruction of the subroutine 52 for storing the command given by the corresponding individual control device. The last instruction of the subroutine 56 precedes the first instruction of the polling program 41. The last instruction of the subroutine 55 precedes the first instruction of the "accepted command" processing program 45. The last instruction of the subroutine 52 precedes the first instruction of the "accepted command" processing program 45. The "accepted command" processed by the program 45 is either the general command stored in the subroutine 55 or the individual command stored in the subroutine 52 depending on the case. The last instruction of the program 45 precedes the first instruction of the timing program 46 intended to preset and then to decrement a timing counter provided in the corresponding microcomputer 1. The last instruction of the program 46 precedes the first instruction of the polling program 41. An individual "STOP" command is given by simultaneously pressing the switches MI and DI and a general STOP command is given by simultaneously pressing the switches MG and DG.

The functioning of the installation will now be described.

The functioning will firstly be described in the case of non-simultaneous operation of the general control device and the individual control device. When the operator operates one of the switches of the individual control, for example the switch MI, the input terminal K1 of the microcomputer is connected to the output terminal R0 and the polling program 41 reads this closure of the switch MI and reads the openings of the other switches and stores the switch settings by means of the program 42. The program 43 tests that at least one switch has been operated. At the end of the program 43, the subroutine 61 tests that there has not been an individual control actuated for a duration longer than the predetermined value T2 and then the subroutine 63 deactuates the indicator if necessary. The subroutine 50 tests that the general control device is not actuated and then tests, as in the prior art, by means of the subroutine 51 that it is not a STOP command. The sequencing then proceeds as described in the patent FR 2,510,777. The subroutine 52 stores the command given. The program 45 reads the command and feeds the terminal R7 of the computer. Then the timing program 46 presets the timing counter, and the polling program 41 again reads the settings of the switches. As long as the operator continues to operate the switch MI, the sequence of programs is repeated as before. The timing counter is decremented each time that the program 46 is run and the output terminal R7 of the computer continues to be supplied until the counter reaches zero, which corresponds to the end of the timing period. When the operator releases the switch MI, the programs 41 and 42 run as before, then the program 43 tests the fact that no switch is actuated. The program 47 for processing the last accepted command reads the raise command previously stored by the subroutine 52 and the timing counter is decremented as described above, the motor 15 stopping at the end of the timing period.

If the operator simultaneously presses the switches MI and DI, the subroutine 51 tests that it is a STOP command, and the subroutine 56 resets the timing counter to zero, which results in the instantaneous stopping of the motor 15.

When the operator operates one or other of the switches of the general control device, for example the switch DG, the running of the programs 41, 42, 43 and 50 proceeds as before. The subroutine 50 tests that it is a command coming from the general control device, then the subroutine 64 tests that the indicator is not act-uated. Then, the sequencing continues as described in the previous patent. The subroutine 53 tests that it is not a general STOP command. The subroutine 55 stores the lower command. The program 45 reads the lower command thus stored and supplies the output terminal R6 of each individual control device. As long as the operator continues to operate the switch DG, the sequence of programs runs as before in each microcomputer 1. When the operator releases the switch DG, the programs 41 and 42 run as before in each microcomputer 1.

If it is a switch MG which is operated, it is then the output terminal R7 of each microcomputer 1 which is supplied and all of the motors 15 rotate in the opposite direction.

As for the individual control, a general STOP command is given by the simultaneous operation of the switches MG and DG, as described in the patent FR 2,510,777.

There will now be a description of what happens in the case of simultaneous operations of the general control device and an individual control device.

In the first place it will be assumed that the duration of operation of the individual control device is shorter than the predetermined value T2 and that the duration of operation of the general control is shorter or longer than the predetermined value T1. In this case, the sequence of programs runs as described above for the actuating of one of the general control switches.

It will then be assumed that the duration of operation of the individual control device is longer than the predetermined value T2 and that the duration of operation of the general control is shorter than the predetermined value T1. Such a situation can result, for example, from the setting of the individual control switch in the actuated position and from the momentary excitation of a sunshine sensor in an installation for the control of blinds. The simultaneous commands firstly cause the running of the same programs 41, 42 and 43 in all of the microcomputers, as described above. At the end of the program 43, the subroutine 61 tests that there is an individual control which has been actuated for at least a duration longer than the predetermined value T2, then the subroutine 62 actuates the indicator and the output R3 of the microcomputer supplying the LED 66 which indicates to the user that a control means of the individual control is set in its actuated position. The subroutine 50 tests that there is a general control, then the subroutine 64 tests that the indicator is actuated. The subroutine 65 tests that the general control is of a duration shorter than the predetermined value T1 and the sequencing continues with the subroutine 51 as previously described in the case of the execution of an individual command. The general control is not executed.

It will finally be assumed that the duration of operation of the individual control device is longer than the predetermined value T2 and that the duration of operation of the general control is longer than the predetermined value T1. In an installation for the control of blinds this situation could occur for example in the case of wind. At the end of the program 43, the subroutine 61 again tests that there is a individual control which has been actuated for at least a duration longer than the predetermined value T2, then the subroutine 62 actuates the indicator. The program 50 tests that there is a general control, then the subroutine 64 tests that the indicator is actuated and the subroutine 65 tests that the general control is of a duration longer than the predetermined value T1. The sequencing then continues from the subroutine 53 as previously described in the case of the execution of a general control and it is the general control which is executed.

When the general control stops, whilst the individual control continues, the programs 41, 42 and 43 run again as before, as well as the subroutines 61 and 62. The subroutine 50 tests that there is no general control. The sequencing continues from the subroutine 51 as previously described in the case of the execution of a non-simultaneous individual control and this individual control is executed.

Figure 3:
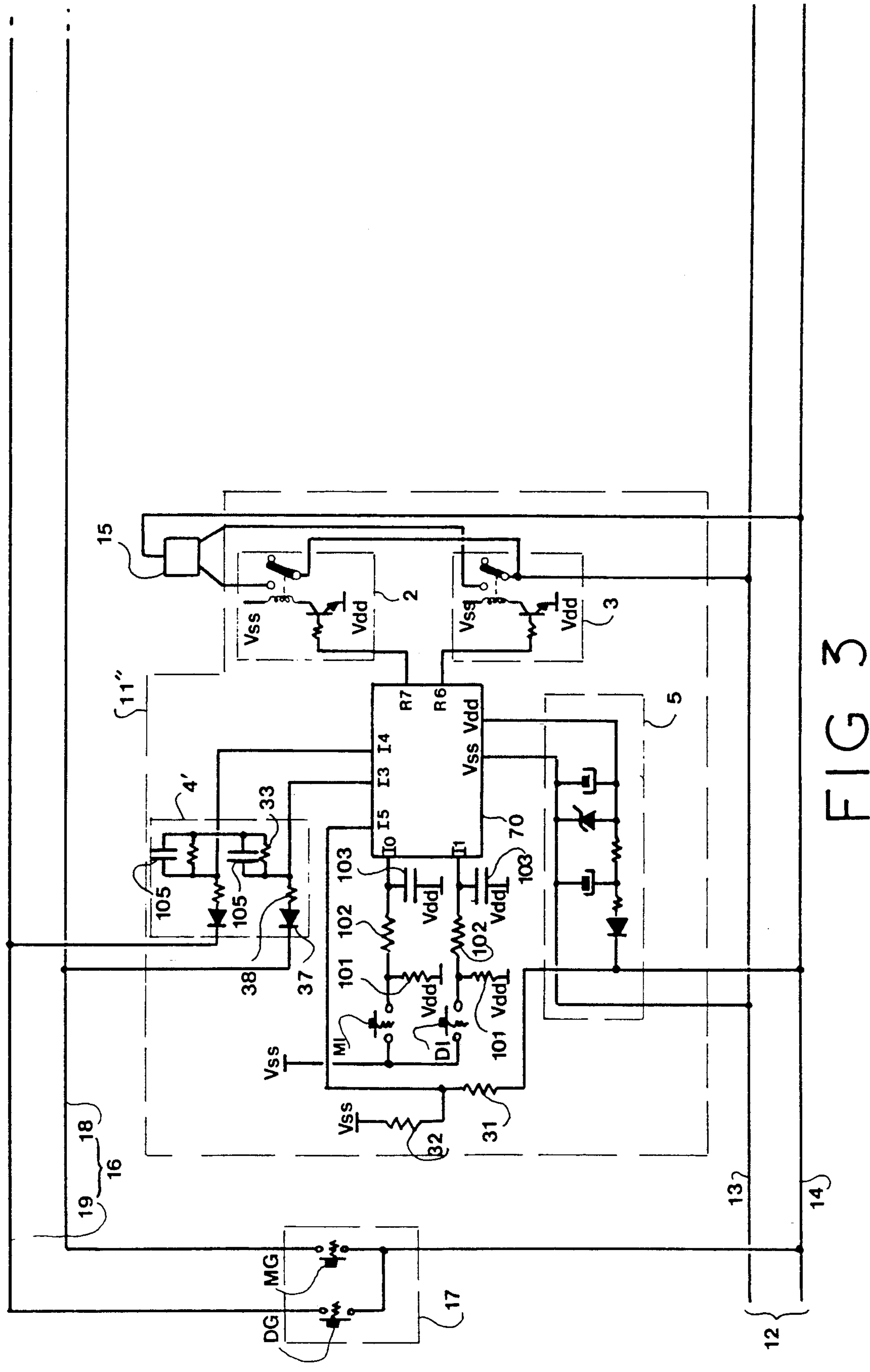
FIG. 3 is the circuit diagram of a second embodiment.
Figure 4:
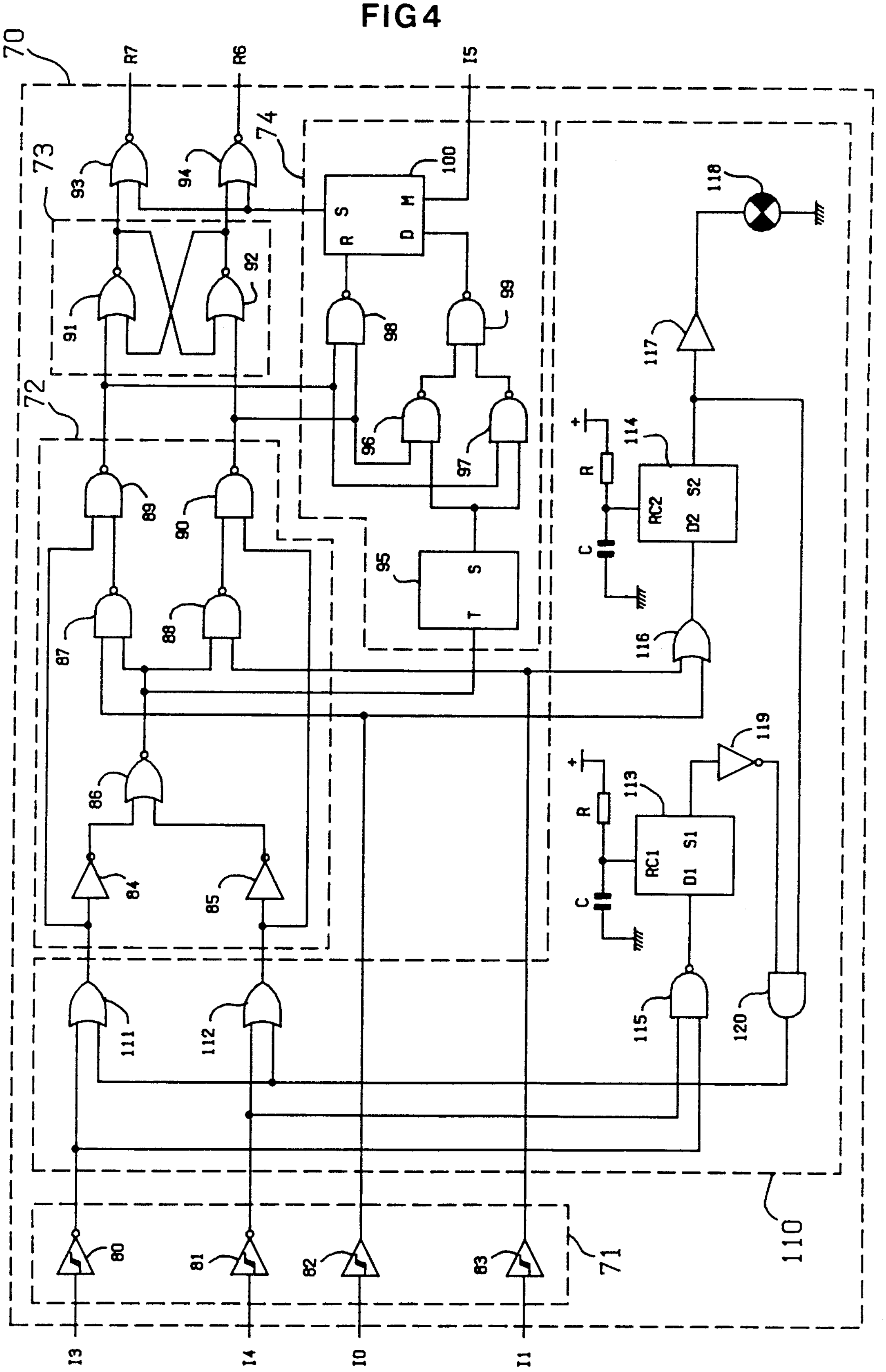
FIG. 4 is the logic circuit constituting the logic processing unit in the circuit in FIG. 3.

The circuit of the second embodiment is shown in FIG. 3. This figure is identical to FIG. 5 of the patent FR 2,510,777 and its description will therefore not be repeated in detail. It will suffice to recall that the installation comprises a certain number of individual control devices 11" each equipped with two individual switches MI and DI and a general control device 17 similar to the device 17 in FIG. 1. The microcomputer in FIG. 1 is replaced by a logic circuit 70 as shown in FIG. 4. This logic circuit 70 differs from the logic circuit 70 shown in FIG. 6 of the patent FR 2,510,777 by the presence of a circuit 110 disposed between the circuits 71 and 72. The inputs I3, I4 and I0 and I1 of the circuit 70 respectively correspond to the switches MG, DG, MI and DI.

The circuit 110 comprises three OR gates 111, 112 and 116, a NAND gate 115, an AND gate 120, an inverting gate 119 and two timing circuits 113 and 114 each comprising an input terminal, D1 and D2 respectively, an output terminal, SI and S2 respectively and a timing terminal, RC1 and RC2 respectively, each connected to a timing circuit RC. The OR gates 111 and 112 each have one of the inputs respectively connected to the outputs of the triggers 80 and 81 of the circuit 71 and another input connected to the output of the AND gate 120. The outputs of the OR gates 111 and 112 are respectively connected to the inverting gates 84 and 85 of the circuit 72. The inputs of the NAND gate 115 are respectively connected to the outputs of the triggers 80 and 81, the output of this gate 115 being connected to the input D1 of the timing circuit 113. The inputs of the OR gate 116 are respectively connected to the outputs of the triggers 82 and 83, while the output of this gate is connected to the input D2 of the timing circuit 114. The output S1 of the timing circuit 113 is applied, through the inverting gate 119, to one of the inputs of the AND gate 120. The output S2 of the timing circuit 114 is applied, on the one hand, to the other input of the AND gate 120 and, on the other hand, to a buffer 117 whose output is connected to one of the terminals of an indicator 118, constituted by an LED, whose other terminal is connected to ground.

Figure 5:
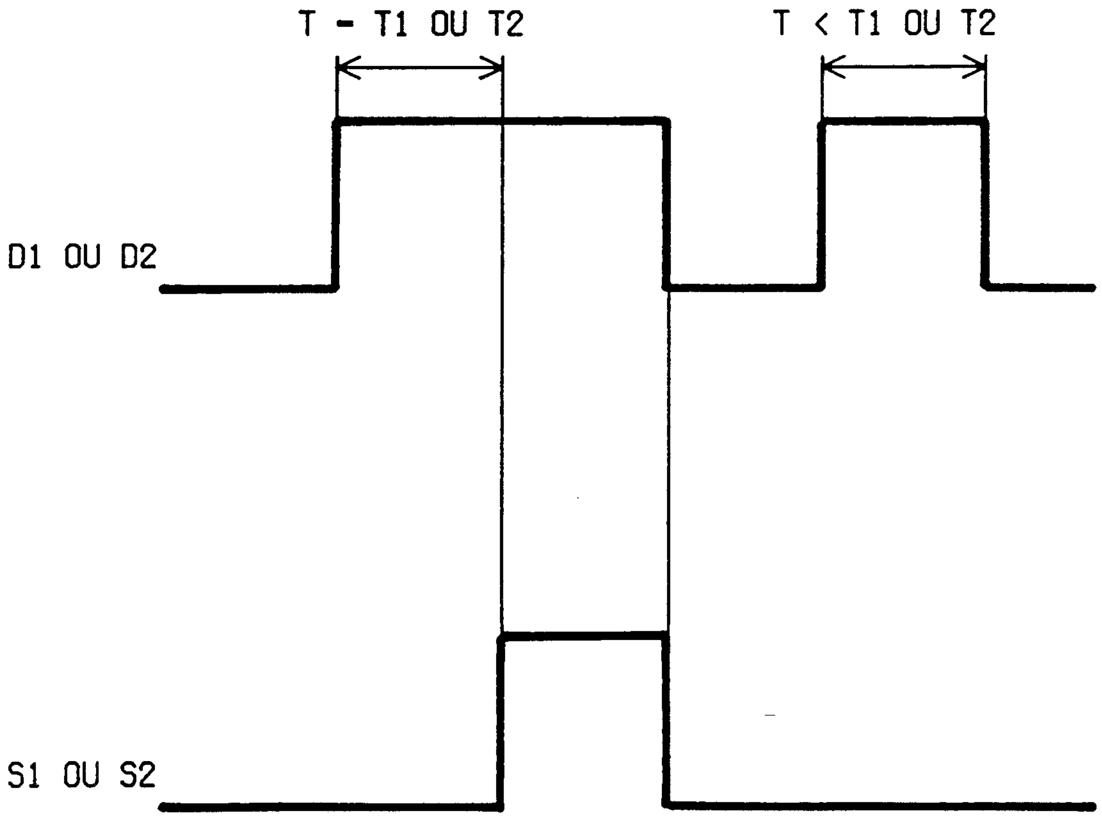
FIG. 5 shows the state of the inputs and the outputs of the timing circuits of the circuit in FIG. 4 in the case in which the action of the general control, and of the individual control respectively, is longer than or shorter than the corresponding predetermined value, T1 or T2 respectively.

The timing circuits 113 and 114 are provided to supply a 1 state on their outputs, S1 and S2 respectively, only if a 1 state is applied to their inputs D1 and D2 respectively for a time longer than the predetermined value T1 for the circuit 113 and T2 for the circuit 114, and to supply a 0 state when the times T1 and T2 are respectively shorter than the predetermined value. The outputs of the circuits 113 and 114 also supply a 0 state when their inputs D1 and D2 are in the 0 state. These conditions are illustrated in FIG. 5. The same diagram is valid for the circuits 113 and 114, the index 1 referring to the circuit 113 and the index 2 referring to the circuit 114.

The functioning of this second embodiment will firstly be described in the case of a non-simultaneous operation of the individual control device and of the general control device. When the operator operates a switch of an individual control, for example a switch MI, the potential of the terminal I0 is taken to that of the terminal Vss and the output of the trigger 82 changes to the 1 state, while the output of the trigger 83 remains in the 0 state and the outputs of the triggers 80 and 81 remain in the 1 state. One of the inputs of the OR gates 111 and 112 is therefore in the 1 state and this 1 state is applied to the inverting gates 84 and 85. The situation is now that of the installation according to the prior art. The output of the gate 86 is in the 1 state and the output of the gate 87 changes to the 0 state. The output of the gate 89 changes to the 1 state which causes the output of the gate 91 to switch to the 0 state. The output of the gate 86 being in the 1 state, the monostable circuit 95 is not triggered and its output S remains in the 1 state. The output of the gate 89 being in the 1 state, the output of the gate 97 changes to the 0 state and the output of the gate 99 changes to the 1 state which triggers, by means of the terminal D of the timing circuit 100, the start of a timing period, for example 3 minutes. In the same time, the output of the gate 90 is in the 0 state, which makes the gate 98 change to the 1 state, and the terminal R of the timing circuit 100 to the 1 state, which enables the output S to change to the 0 state since the start of the timing period has been triggered, and the output of the gate 93 to the 1 state. The individual control MI is therefore executed, the motor 15 being supplied and the switch MI being able to be released given that the output R7 remains supplied as long as the timing period has not finished.

If the control DI had been operated, the respective states of the inputs of the triggers 82, 83 and of the outputs of the gates 84 and 85 would have been 0, 1, 1, 1, these states corresponding to the case of an individual control DI in the prior installation, and the individual control DI would have been executed.

As in the prior installation, a simultaneous operation of the switches MI and DI corresponds to a STOP command. In this case, the outputs of the gates 89 and 90 both change to the 1 state and the output of the gate 98 changes to the 0 state which has the effect of resetting the timing period to 0. The outputs of the gates 93 and 94 return to the 0 state, the output terminals R6 and R7 are no longer supplied and the motor 15 stops.

If the operator operates one of the general controls, for example the control DG, and none of the individual controls is operated, the outputs of the triggers 82 and 83 remain in the 0 state, while the output of the trigger 81 changes to the 0 state and the output of the trigger 80 remains in the 1 state. The output S2 of the timing circuit 114 therefore remains in the 0 state and the output of the AND gate 120 remains in the 0 state. The output of the OR gate 112 changes to the 0 state which is applied to the inverting gate 85, while the OR 111 output remains in the 1 state which is applied to the inverting gate 84. This configuration of states corresponds to the configuration of states of the circuit of the prior installation in the case of a general control DG which is simultaneous with an individual control. The output of the NOR gate 86 changes to the 0 state and the output of the NAND gate 90 changes to the 1 state. The terminal T of the monostable circuit 95 changes to the 0 state, and the output S of this circuit 95 changes to the 0 state during the period of the monostable circuit 95. The terminal D of the timing circuit 100 changes to the 0 state during this period. This enables the timing circuit 100 to be retriggered, because when the output S of the monostable circuit 95 returns to the 1 state, the output of the gate 99 changes to the 1 state, since the output of the gate 90 is in the 1 state, which has the effect of restarting a timing cycle, since the output of the gate 98 is also in the 1 state, the output of the gate 89 being in the 0 state. The output of the gate 90 being in the 1 state, the output of the gate 92 is in the 0 state and the output of the gate 94 changes to the 1 state, since the output S of the timing circuit 100 is in the 0 state. The output R6 is supplied and the general control DG is executed.

If the general control MG had been operated, the respective states of the inputs of the triggers 82 and 83 and of the outputs of the inverting gates 84 and 85 would have been 0, 0, 0, 1, these states corresponding to the case of a general control MG simultaneous with an individual control in the prior installation and the general control MG would have been executed.

The case of a simultaneous operation of the general control device and of the individual control device will now be examined. Three cases should be distinguished:

a) The operation of the individual control device is of a duration shorter than the predetermined value T2 and the operation of the general control device is of a duration shorter than or longer than the predetermined value T1;

b) The operation of the individual control device is of a duration longer than the predetermined value T2 and the operation of the general control device is of a duration shorter than the predetermined value T1; shorter than the predetermined value T1;

c) The operation of the general control device is of a duration longer than the predetermined value T1 and the operation of the individual control is of a duration longer than the predetermined value T2.

In the case a), let it be assumed that there is a simultaneous operation of MG and DI. The output of the trigger 82 remains in the 0 state. The output of the trigger 83 changes to the 1 state. The output of the trigger 80 changes to 1 state. The output of the trigger 81 remains in the 1 state and the input of the inverting gate 85 remains in the 1 state.

The duration of the operation DI being shorter than T2, the output S2 of the timing circuit 114 remains at 0 (FIG. 5). The same applies to the output of the AND gate 120. The output of the OR circuit 111 therefore remains in the 0 state and the input of the inverting gate 84 remains at 0. If the duration of the operation of MG is longer than T1, the output S1 of the timing circuit 113 changes to the 1 state, but the output S2 of the timing circuit 114 remains in the 0 state. The output of the AND gate 120 therefore remains in the 0 state, this state being applied to the inverting gate 84. This configuration of states corresponds to the configuration of the prior circuit in the case of the simultaneous existence of general and individual controls, the priority being given to the general control. The general control is therefore executed.

In the case b), with a simultaneous operation of MG and DI, for example, i.e. with a same state at the outputs of the triggers 80 to 83 as in the case a), if the duration of the operation of DI is longer than T2, the output S2 of the timing circuit 114 changes to the 1 state, while the output S1 of the timing circuit 113 remains in the 0 state. The output of the AND gate 120 and the output of the buffer 117 change to the 1 state. The state of the output of the OR gate 112, applied to the inverting gate 85, remains 1. On the other hand the output of the OR gate 111 changes to the 1 state, this 1 state being applied to the inverting gate 84. The respective states of the outputs of the triggers 82 and 83 and of the inverting gates 84 and 85 remain 0, 1, 1, 1 and the individual control is executed.

In the case c) with a simultaneous operation of MG and DI, for example, the outputs of the triggers 80 to 83 being the same as in the case a) and the duration of the operation of MG being longer than T1, the output S1 of the timing circuit 113 therefore changes to the 1 state (FIG. 5) and the output of the inverting gate 119 changes to the 0 state. The output of the AND gate 120 therefore changes to the 0 state. The output state of the OR gate 112 is not changed, and neither is the input state of the inverting gate 85. The output state of the OR gate 111 changes to 0 state, as does the input state of the inverting gate 84.

The respective states of the outputs of the triggers 82 and 83 and of the inputs of the inverting gates 84 and 85 are 0, 1, 0, 1 as in the case a) and the general control is executed.

The buffer 117 being in the 1 state, the LED 118 is illuminated, which indicates to the user the locked-on state of the individual control (case b) and c)). When the general control ceases, the output of the trigger 80 returns to the 1 state which is therefore re-applied to the input of the inverting gate 84. The circuits 82, 83, 84 and 85 respectively return to the states 0, 1, 1, 1, and the individual control is executed.

I claim:

1. An installation for the control of several electrical receivers capable of being in at least two states, comprising a plurality of individual control devices each control device connected to a receiver and each control device comprising control switching means to control, at will, said receiver, each control device being controlled by a common control line connected to a general control device, said general control device comprising a general switching means to control, at will, all of the receivers, each inidividual control device comprising a logic processing unit, said logic processing unit comprising a first group of input gates, said first input gates are connected to said control switching means, and output terminals connected to the receivers, a second group of inputs, said general control switching means connected to said second group of inputs of each logic processing unit, each logic processing unit being provided with means for accepting commands given in a non-simultaneous manner by the general control device and the individual control device, arranging each logic processing unit of the individual control devices to provide in the case in which the general control and the individual control are actuated simultaneously, that the logic processing unit accepts the general control command as a matter of priority unless the latter is of a duration shorter than a first value and if, at the time of the start of the general control command, at least one of the control means of the individual control device has been actuated for a duration longer than at least a second value.

2. The control installation as claimed in claim 1, wherein each logic processing unit is constituted by a microcomputer containing in its non-volatile memory a polling program, a storage program, a program for testing the presence of a command from the general or individual control and a program for managing the commands given by the control devices, operating sequentially, the polling program collecting, on the first group of input terminals information relating to the position of said control switching means of the corresponding individual control device and on the second group of input terminals information relating to the position of the general switching means, the storage program storing positions of the control and general switching means, the program for managing the commands given by the control devices testing the presence of a command from the individual control device of a duration longer than the second predetermined value, testing the presence of a command from the general control, testing the duration of the command from the general control and wherein when the presence of a command from the individual control is longer than the second value, executing the command from the general control when the command from the general control is of a duration longer than or equal to the first value.

3. The control installation as claimed in claim 1, wherein each logic processing unit has a logic circuit, said logic circuit comprising a reading logic circuit for reading the setting of said control and general switching means connected to a priority logic circuit said priority logic circuit comprising means for comparison of the durations of commands coming from the general control and from the individual control with the said first and second values, and means for blocking the command from the general control if, in the case of the simultaneous presence of commands from the general control and from the individual control, the duration of the general control is shorter than the first value while the duration of the command from the individual control has exceeded the second value, said priority logic circuit being connected to a logic storing circuit for storing the accepted command and for controlling or not controlling one of the output terminals of the logic circuit.

* * * * *